(12) United States Patent
Plaehn (10) Patent No.: US 9,569,686 B2
(45) Date of Patent: Feb. 14, 2017

(54) MOBILE DEVICE FIELD OF VIEW REGION DETERMINATION

(71) Applicant: International Business Machines Corporation, Armonk, NY (US)

(72) Inventor: William H. Plaehn, Clifton, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/850,133

(22) Filed: Sep. 10, 2015

(65) Prior Publication Data

US 2015/0379367 A1  Dec. 31, 2015

Related U.S. Application Data

(63) Continuation of application No. 13/768,337, filed on Feb. 15, 2013, now Pat. No. 9,167,147.

(51) Int. Cl.
*G06K 9/46* (2006.01)
*H04N 5/232* (2006.01)
(Continued)

(52) U.S. Cl.
CPC .............. *G06K 9/46* (2013.01); *G01B 11/14* (2013.01); *G06K 9/0061* (2013.01); *G06K 9/00268* (2013.01); *G06K 9/52* (2013.01); *G06K 9/6267* (2013.01); *G06T 7/0042* (2013.01); *G06T 7/60* (2013.01); *G06T 19/006* (2013.01);
(Continued)

(58) Field of Classification Search
CPC ............ H04N 5/23212; H04N 5/23219; H04N 5/23216; H04N 5/23222; H04N 5/23293; H04N 5/23296; H04N 5/2628; G06K 9/46; G06K 9/00268; G06K 9/0061;G06K 9/52; G06K 9/6267; G06K 2009/4666; G01B 11/14; G06T 7/0042; G06T 7/60; G06T 19/006
See application file for complete search history.

(56) References Cited

U.S. PATENT DOCUMENTS 7,986,299 B2   7/2011   Ota et al.
8,159,458 B2   4/2012   Quennesson
(Continued)

FOREIGN PATENT DOCUMENTS

EP   1056049   11/2000
WO   2011125007   10/2011
WO   2012054063   4/2012

OTHER PUBLICATIONS

Amendment filed Nov. 3, 2015 in response to Office Action (Mail Date Aug. 7, 2015) for U.S. Appl. No. 14/614,828, filed Feb. 5, 2015.
(Continued)

*Primary Examiner* — Twyler Haskins
*Assistant Examiner* — Angel L Garces-Rivera
(74) *Attorney, Agent, or Firm* — Schmeiser, Olsen & Watts (57) ABSTRACT

A method and system for determining a field of view region on a mobile device display is provided. The method includes receiving by a mobile device from a user facing camera of the mobile device, an image of a user currently using the mobile device. Key features of the image are identified and attributes of the key features are determined. The attributes are analyzed and a specified region within a field of view of an object facing camera of the mobile device is determined. Data associated with the specified region is provided for a software application.

20 Claims, 8 Drawing Sheets

(51) Int. Cl.

| | | |
|---|---|---|
| *G01B 11/14* | (2006.01) | |
| *G06K 9/00* | (2006.01) | |
| *G06K 9/52* | (2006.01) | |
| *G06K 9/62* | (2006.01) | |
| *G06T 7/00* | (2006.01) | |
| *G06T 7/60* | (2006.01) | |
| *G06T 19/00* | (2011.01) | |
| *H04N 5/262* | (2006.01) | |

(52) U.S. Cl.
CPC ..... *H04N 5/23212* (2013.01); *H04N 5/23216* (2013.01); *H04N 5/23219* (2013.01); *H04N 5/23222* (2013.01); *H04N 5/23293* (2013.01); *H04N 5/23296* (2013.01); *H04N 5/2628* (2013.01); *G06K 2009/4666* (2013.01)

(56) References Cited

U.S. PATENT DOCUMENTS

| | | | |
|---|---|---|---|
| 8,571,579 | B2 | 10/2013 | Lindner |
| 9,041,645 | B2 | 5/2015 | Plaehn |
| 9,167,147 | B2 | 10/2015 | Plaehn |
| 2008/0002964 | A1 | 1/2008 | Edwards |
| 2009/0048767 | A1 | 2/2009 | Vaughn |
| 2009/0313584 | A1 | 12/2009 | Kerr et al. |
| 2011/0285622 | A1 | 11/2011 | Marti et al. |
| 2012/0098761 | A1 | 4/2012 | Mitchell et al. |
| 2012/0120186 | A1 | 5/2012 | Diaz et al. |
| 2012/0147328 | A1 | 6/2012 | Yahav |
| 2012/0162603 | A1 | 6/2012 | Dejima |
| 2012/0200498 | A1 | 8/2012 | Quennesson |
| 2012/0210233 | A1 | 8/2012 | Davis et al. |
| 2012/0212484 | A1 | 8/2012 | Haddick et al. |
| 2013/0207896 | A1 | 8/2013 | Robinson et al. |
| 2014/0232630 | A1 | 8/2014 | Plaehn |
| 2014/0232881 | A1 | 8/2014 | Plaehn |
| 2015/0145771 | A1 | 5/2015 | Plaehn |

OTHER PUBLICATIONS

Notice of Allowance (Mail Date Nov. 20, 2015) for U.S. Appl. No. 14/614,828, filed Feb. 5, 2015.
Amendment filed Dec. 31, 2014 in response to Office Action (Mail Date Oct. 8, 2014) for U.S. Appl. No. 13/768,548, filed Feb. 15, 2013.
Notice of Allowance (Mail Date Jan. 22, 2015) for U.S. Appl. No. 13/768,548, filed Feb. 15, 2013.
Notice of Allowance (Mail Date Jun. 12, 2015) for U.S. Appl. No. 13/768,337, filed Feb. 15, 2013.
Office Action (Mail Date Jan. 16, 2015) for U.S. Appl. No. 13/768,337, filed Feb. 15, 2013.
Office Action (Mail Date Oct. 8, 2014) for U.S. Appl. No. 13/768,548, filed Feb. 15, 2013.
Amendment filed Apr. 9, 2015 in response to Office Action (Mail Date Jan. 16, 2015) for U.S. Appl. No. 13/768,337, filed Feb. 15, 2013.
Office Action (Mail Date Aug. 7, 2015) for U.S. Appl. No. 14/614,828, filed Feb. 5, 2015.

MOBILE DEVICE FIELD OF VIEW REGION DETERMINATION

This application is a continuation application claiming priority to Ser. No. 13/768,337 filed Feb. 15, 2013, now U.S. Pat. No. 9,167,147, issued Oct. 20, 2015.

FIELD

The present invention relates generally to a method determining a field of view region, and in particular to a method and associated system for determining a region within a field of view between a user and an object relative to a mobile device display apparatus.

BACKGROUND

Determining image placement location typically includes an inaccurate process with little flexibility. Managing placement of various images may include a complicated process that may be time consuming and require a large amount of resources. Accordingly, there exists a need in the art to overcome at least some of the deficiencies and limitations described herein above.

SUMMARY

A first aspect of the invention provides a method including: receiving, by a computer processor of a mobile device from a user facing camera of said mobile device, an image of a user currently using the mobile device; identifying, by the computer processor, key features of the image; determining, by the computer processor based on the key features, attributes of the key features; analyzing, by the computer processor, the attributes; determining, by the computer processor based on results of the analyzing, a specified region within a field of view of an object facing camera of the mobile device; and providing, by the computer processor for a software application, information associated with the specified region.

A second aspect of the invention provides a computer program product for field of view region determination, the computer program product including: one or more computer-readable, tangible storage devices; program instructions, stored on at least one of the one or more storage devices, to initiate receiving, from a user facing camera of the mobile device, an image of a user currently using the mobile device; program instructions, stored on at least one of the one or more storage devices, to identify key features of the image; program instructions, stored on at least one of the one or more storage devices, to determine, based on the key features, attributes of the key features; program instructions, stored on at least one of the one or more storage devices, to analyze the attributes; program instructions, stored on at least one of the one or more storage devices, to determine, based on results of the analyzing, a specified region within a field of view of an object facing camera of the mobile device; and program instructions, stored on at least one of the one or more storage devices, to initiate providing information associated with the specified region.

A third aspect of the invention provides a mobile device including a computer processor coupled to a computer-readable memory unit, the memory unit comprising instructions that when executed by the computer processor implements a method including: receiving, by the computer processor from a user facing camera of the mobile device, an image of a user currently using the mobile device; identifying, by the computer processor, key features of the image; determining, by the computer processor based on the key features, attributes of the key features; analyzing, by the computer processor, the attributes; determining, by the computer processor based on results of the analyzing, a specified region within a field of view of an object facing camera of the mobile device; and providing, by the computer processor for a software application, information associated with the specified region.

The present invention advantageously provides a simple method and associated system capable of determining image placement.

DETAILED DESCRIPTION

Figure 1A:
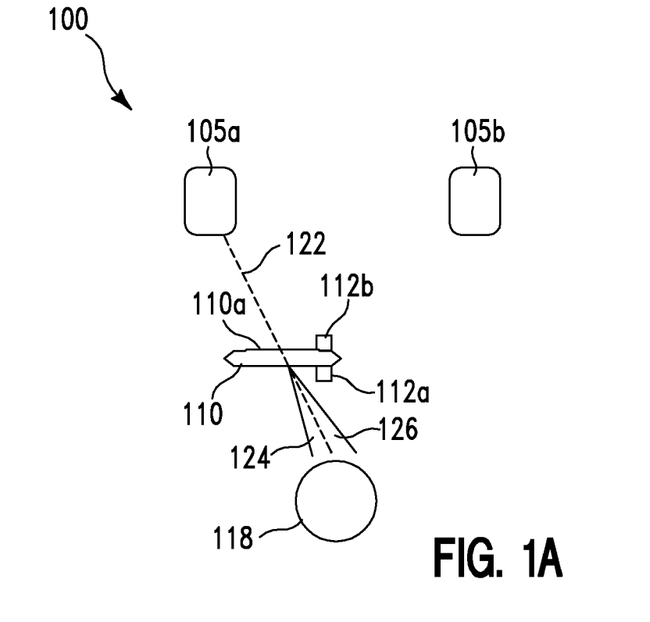
FIG. 1A illustrates a system for determining a region within a field of view between a user and an object relative to a mobile device display apparatus, in accordance with embodiments of the present invention.

FIG. 1A illustrates a system 100 for determining a region within a field of view 122 between a user 118 and an area 105a relative to a mobile device 110 display apparatus 110a, in accordance with embodiments of the present invention. The above and other features of the present invention will become more distinct by a detailed description of embodiments shown in combination with attached drawings. Identical reference numbers represent the same or similar parts in the attached drawings of the invention.

As will be appreciated by one skilled in the art, aspects of the present invention can be embodied as a system, method or computer program product. Accordingly, aspects of the present invention can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the present invention can take the form of a computer program product embodied in one or more computer readable medium(s) having computer readable program code embodied thereon.

Any combination of one or more computer readable medium(s) can be utilized. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

Computer program code for carrying out operations for aspects of the present invention can be written in any combination of one or more programming languages, including an object oriented programming language such as Java, Smalltalk, C++ or the like and conventional procedural programming languages, such as the "C" programming language or any type of programming languages such as, inter alia, an assembly language. The program code can execute entirely on the user's device, partly on the user's device, as a stand-alone software package, partly on the user's device.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which includes one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

System 100 performs a process for determining a region within a field of view of an object facing camera 112*b* relative to a line of sight 122 between a user 118 and an object or area relative to a display apparatus 110*a* of a mobile device 110. System 100 enables a generic pattern recognition process with respect to facial features via a user facing camera(s) 112*a* (e.g., recognition of relative positions of facial features including, inter alia, eyes, ears, nose, etc.) to triangulate a relative eye position in order to infer line of sight information. System 100 may determine the angle and distance of a user's eyes/face from itself via user facing camera 112*a*. The angle and distance may be used to determine an area of a scene that the user is focusing on.

System 100 includes a mobile device 110 that includes a user facing camera(s) 112*a*, an object facing camera(s) 112*b*, and software for discern a user's 118 relative eye position with respect to a display apparatus 110*a* of mobile device 110. Mobile device 110 may include any type of mobile device including, inter alia, a cellular telephone, a PDA, a smart phone, etc. System 100 allows image selections to be made by a relative position of a display apparatus and user irrespective of an angle of the display apparatus. System 100 enables a process for determining a location of user 118 relative to a display apparatus (e.g., display apparatus 110*a*) via user facing camera 112*a*. In order to determine a location of user 118 relative to a display apparatus, mobile device 110 determines a relative distance between the user's eyes (or other size and orientation measure such as a face) and an angle between the user's eyes/face with respect to user facing camera 112a. The determined angle and distance are used to determine an area of a scene (i.e., to the front of user 118) that user 118 is focusing on. User facing camera 112a (or cameras) is located in a known position relative to display apparatus 110a (or any feature) of mobile device 110 in order to discern the user's eye position and an angle relative to display apparatus 110a or any feature of mobile device 110. The use of a single user facing camera allows the user's relative position to display apparatus 110a (or any feature of mobile device 110) to be determined via the determined angle and distance. The use of multiple known position user facing cameras enables a triangulation process for determining the user's relative position. The use of a single object facing camera is sufficient to determine an approximation of a line of sight 122. The use of multiple object facing cameras enable a triangulation process with respect to areas so that an accurate line of sight 122 may be determined. The aforementioned information is used by mobile device 110 to determine a focus area of user 118. For example, using a cellular phone, a user may focus on a specific area within an object facing camera's viewing angle by holding the phone between him/her and a desired area of focus and while moving the cellular phone closer or further from him/her, a size of the focus area may be automatically modified. The following description details an implementation example enabled by system 100 of FIG. 1A as follows:

User 118 uses mobile device 110 (including user facing camera(s) 112a and object facing camera(s) 112b) to focuses on a first area 105a by holding mobile device 110 between him/her and first area 105a. This process may be enabled irrespective of an angle of the device. Mobile device 110 uses a relative position of the user's eyes (via angles 124 and 126) with respect to user facing camera 112a to determine a section of object facing camera(s) 112b view to focus on. Note that offset measurements of both vertical and horizontal axis are determined.

Figure 1B:
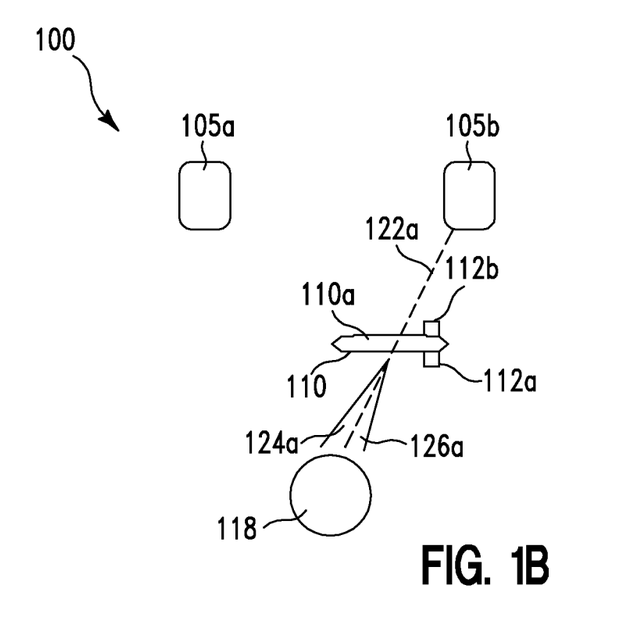
FIG. 1B illustrates an alternative view of the system the system of FIG. 1A, in accordance with embodiments of the present invention.

FIG. 1B illustrates an alternative view of system 100 for determining a region within a field of view 122 between a user 118 and an object relative to a mobile device 110 display apparatus 110a, in accordance with embodiments of the present invention. In contrast to FIG. 1A, FIG. 1B illustrates mobile device 110 (including user facing camera 112a and object facing camera(s) 112b) focusing on a second area 105b. Mobile device 110 (in FIG. 1B) uses a relative position of the user's eyes (via angles 124a and 126a) with respect to user facing camera 112a to determine a section of object facing camera(s) 112b view to focus on. Note that offset measurements of both vertical and horizontal axis are determined.

Figure 2A:
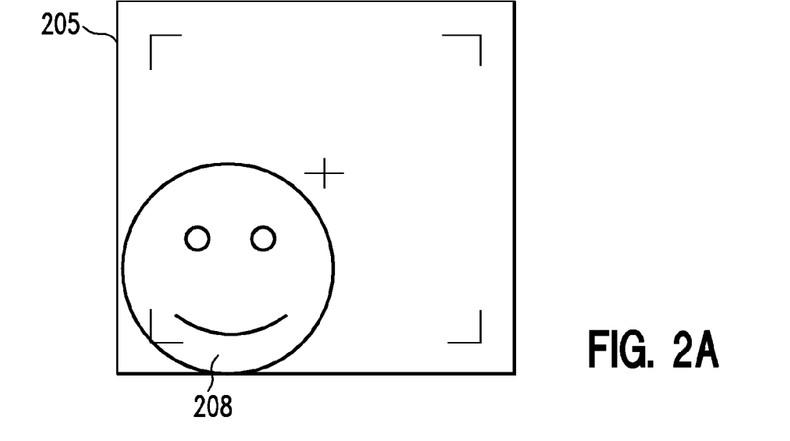
FIGS. 2A-2D illustrate various internal logic views of the mobile device of FIGS. 1A and 1B, in accordance with embodiments of the present invention.

FIG. 2A illustrates an internal logic view/user image 205 of mobile device 110 of FIGS. 1A and 1B, in accordance with embodiments of the present invention. Internal logic view/user image 205 illustrates a retrieved image of a user 208. Image 205 may be retrieved using a user facing camera.

Figure 2B:
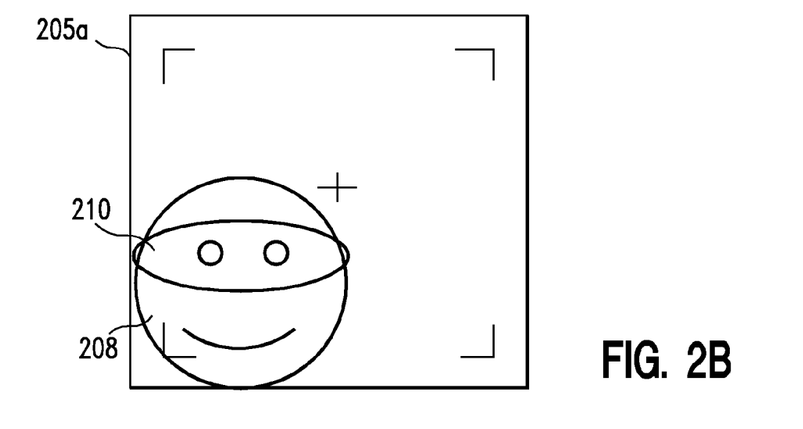

FIG. 2B illustrates an internal logic view 205a of mobile device 110 of FIGS. 1A and 1B, in accordance with embodiments of the present invention. Internal logic view 205a illustrates a method for identifying key features 210 of a user's face or head. The key features are used to determine a position of the user's eyes relative to a user facing camera.

Figure 2C:
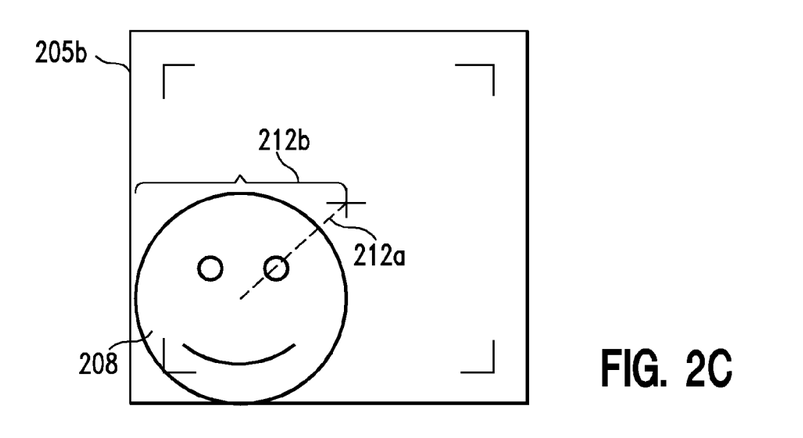

FIG. 2C illustrates an internal logic view 205b of mobile device 110 of FIGS. 1A and 1B, in accordance with embodiments of the present invention. Internal logic view 205b illustrates a process for identifying a user face angle, relative angle, and distance relative to a user facing camera. Internal logic view 205b illustrates logic for determining an origin of the user's line of sight (i.e., in 3D coordinates or a distance measured and location of the origin of the user's line of sight relative to a field of view) based on: relative angle to the user facing camera, distance, and face angle. A face angle is defined herein as an angle of the user's head relative to the user facing camera (e.g., is the user's head turned). A relative angle is defined herein as a determination of a location of the user's eyes relative to a user facing camera. A distance is defined herein as an approximate distance of the user derived from attributes of facial features that may factor in a face angle. Data 212a (user relative angle) and 212b (e.g., measurement of facial features) includes information used to determine an angle and distance of the user with respect to the user facing camera.

Figure 2D:
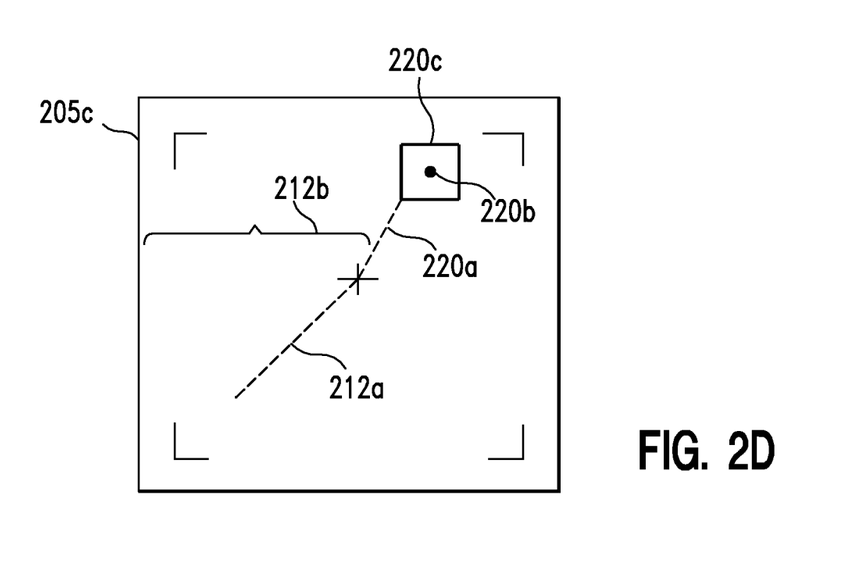

FIG. 2D illustrates an internal logic view 205c of mobile device 110 of FIGS. 1A and 1B, in accordance with embodiments of the present invention. Internal logic view 205c illustrates a process for using information 212a and 212b (as described with respect to FIG. 2C, supra) to identify a point 220b or an area 220c (extended from line 220a) in a field of view of an object facing camera. Internal logic view 205c includes logic for locating point 220b or area 220c within the FOV of an object facing camera. Data 212a or 212b yield an origin a line of sight in a coordinate system resulting in a calculation for point 220b or area 220c. Internal logic view 205c enables a transformation for:

1. Positioning of a display relative to the user facing camera.
2. Positioning of a display relative to the object facing camera.
3. Positioning of the object facing camera relative to the user facing camera.
4. Positioning of a feature of the device (e.g., a viewfinder or sight) relative to the user facing camera.

An example transformation is described as follows:

A location of the user's origin of line of sight (in x, y coordinates with an origin at the center of the user facing camera's field of view) is inputted into the logic and is transformed by a function of t( ) to yield an output as follows: $t(x, y)=(-x, -y)$. Therefore (with respect to a co-located object and user facing cameras with identical optics oriented 180 degrees from each other), the aforementioned transformation determines a point within the FOV of the object facing camera that lies on the line made by the origin of the user's line of sight and the user facing camera. Note that the use of 2D characteristics additionally enables an accurate transformation. Additionally, various configurations of cameras or a display of a mobile device may enable transformations for determining a region within a field of view of an object facing camera. The example transformation is further described with respect to FIG. 3, infra.

Data associated with the transformation is provided to an external software application incorporating a camera. For example:

1. An augmented reality application performing a search for information based on an image. The augmented reality application reduces a processing load by enabling a user to easily provide an object of interest. Additionally, the augmented reality application allows a process for cropping information thereby allowing the user to specify or prioritize a region for providing information.
2. A photography application for zooming/cropping a picture thereby allowing a user to understand a frame of a picture using a position of the camera device. Additionally, the photography application performs an automated zooming process.

3. A photography application for determining an object for autofocus/metering.

Figure 3:
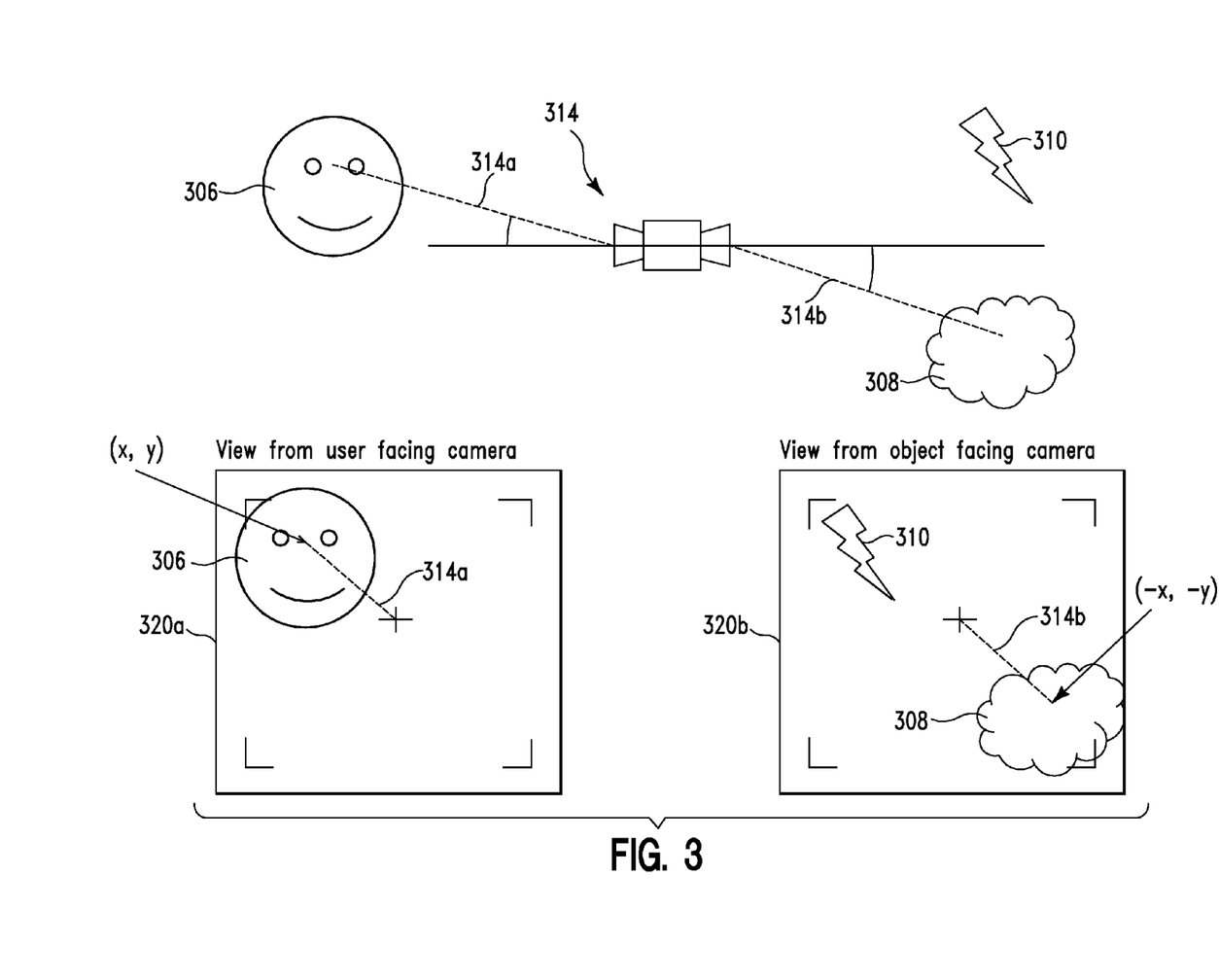
FIG. 3 illustrates a first transformation implementation example enabled by the system of FIGS. 1A and 1B, in accordance with embodiments of the present invention.

FIG. 3 illustrates a first transformation implementation example enabled by system 100 of FIGS. 1A and 1B, in accordance with embodiments of the present invention. In the example, a location of a user's 306 origin of line of sight 314a in x, y coordinates with an origin at the center of the user facing camera's field of view is inputted into the system. The function t(x, y) yields (−x, −y). For co-located object facing and user facing cameras with identical optics, oriented 180 degrees from each other, t( ) determines a point within the field of view of the object facing camera that lies on a line generated by the origin of the user's line of sight and the user facing camera. View 320a (view from user facing camera) and view 320b (view from object/object facing camera) illustrates user 306 positioning mobile device 314 between him/herself and the object 308 of focus (not background object 310). The mobile device determines the origin of the user's line of sight and applies the transformation as described, supra.

Figure 4A:
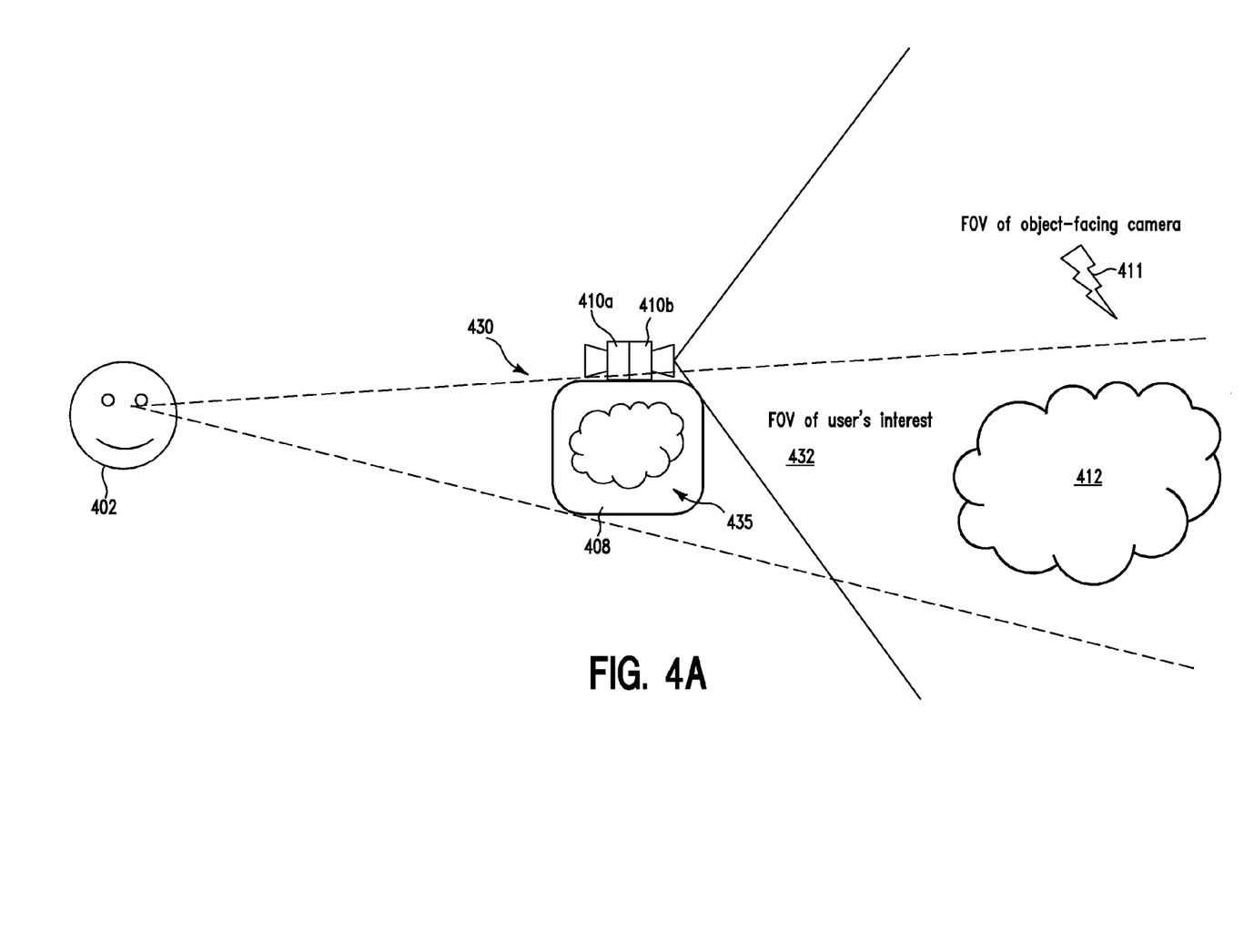
FIGS. 4A and 4B illustrate a second transformation implementation example enabled by system 100 of FIGS. 1A and 1B, in accordance with embodiments of the present invention.
Figure 4B:
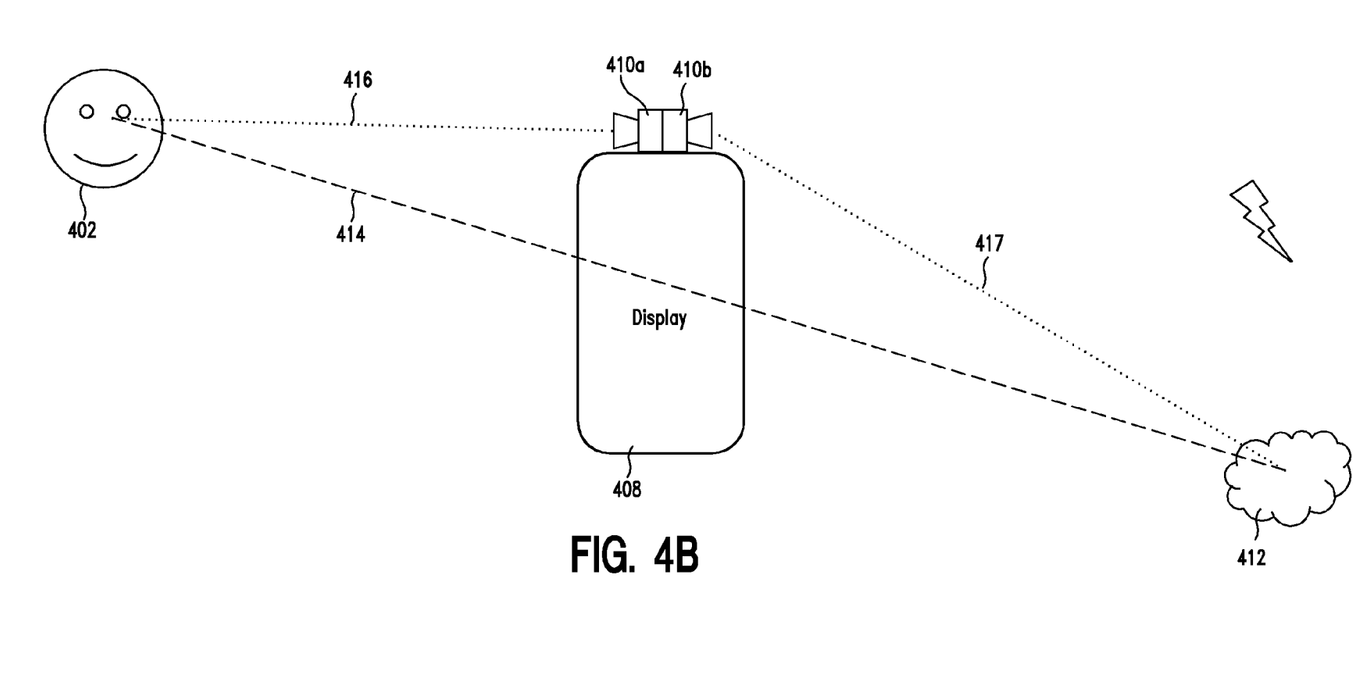

FIGS. 4A and 4B illustrate a second transformation implementation example enabled by system 100 of FIGS. 1A and 1B, in accordance with embodiments of the present invention.

FIG. 4A illustrates a user 402 positioning a display 408 (of a mobile device) between him/herself and an object 412 of focus (not object 411). The mobile device determines an origin of the user's line of sight and applies a similar transformation as described, supra. The transformation factors in relative positions of the display's corners 430, a user facing camera 410a, an object facing camera 410b, and any optic differences (field of view differences) between user facing camera 410a and object facing camera 410b. An output of the aforementioned process allows the mobile device to determine a sub-area 432 of object facing camera 410b to display for capture or further processing. Display 408 is positioned by user 402 between him/herself and object 412. Display 408 illustrates a cropped field of view 435.

FIG. 4B illustrates an input 416 and an output 417 of the process described with respect to FIG. 4A. Line of sight 414 includes a line created by a location of a user's facial features and a point relative to a display or feature of a mobile device. An output point or area of object facing camera 410b, represented by output 417, is calculated such that this point or area lies on an approximation of line of sight 414. The aforementioned process may factor a size and position of display 408 relative to user facing camera 410a and object facing camera 410b. Additionally, optical properties of user facing camera 410a and object facing camera 410b may be factored. In this example, user facing camera 410a and object facing camera 410b are mechanically coupled.

Figure 5:
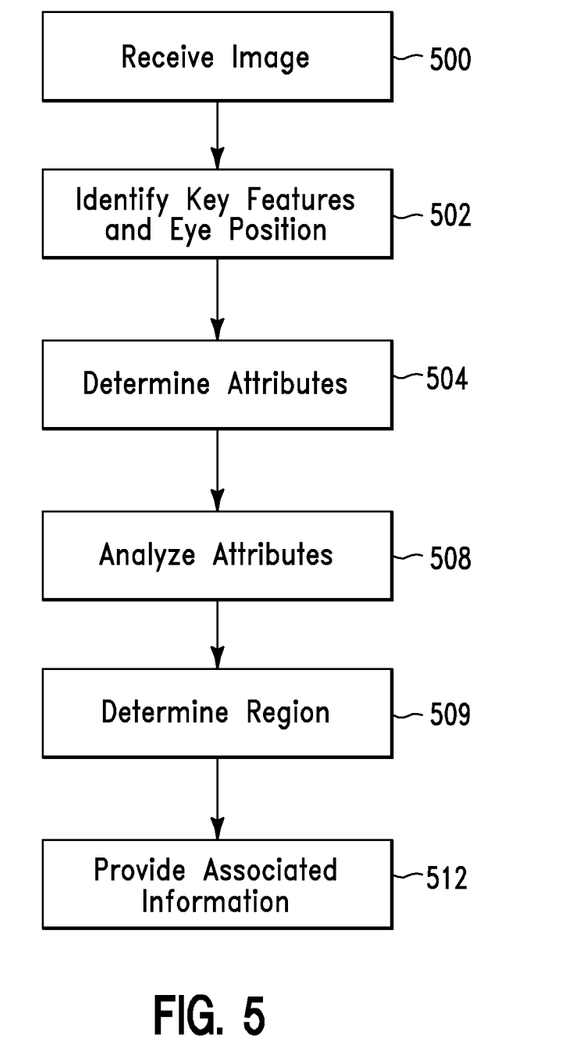
FIG. 5 illustrates an algorithm detailing a process flow enabled by the systems of FIG. 1A and FIG. 1B, in accordance with embodiments of the present invention.

FIG. 5 illustrates an algorithm detailing a process flow enabled by system 100 of FIG. 1A and FIG. 1B, in accordance with embodiments of the present invention. Each of the steps in the algorithm of FIG. 5 may be enabled and executed by a computer processor executing computer code. In step 500, a mobile device receives an image of a user from a user facing camera of the mobile device. In step 502, program instructions identify key features of the image. Additionally, program instructions may identify a position of the user's eyes with respect to the user facing camera based on the key features. The key features may include facial features of the user. The facial features may include eyes of the user. In step 504, program instructions determine attributes of the key features. Determining the attributes may include, inter alia: determining an angle of the user's head with respect to the user facing camera, determining a distance of the user with respect to the user facing camera, etc. In step 508, program instructions analyze the attributes. In step 509, program instructions determine a specified region within a field of view of an object facing camera of the mobile device based on results of the analysis of step 508. Determining the specified region may be further based on the position of the user's eyes with respect to the user facing camera. Determining the specified region may include: factoring a position of a display of the mobile device with respect to the user facing camera; factoring at least one position of the display with respect to the object facing camera; factoring a position of the user facing camera with respect to the object facing camera; factoring a position of a feature of the mobile device (e.g., a viewfinder of the mobile device) with respect to the user facing camera; etc. The specified region may include a point within the field of view of the object facing camera. The point may be located relative to a line formed between an origin of a line of sight of the user and a point relative to a location of the user facing camera. In step 512, program instructions provide information associated with the specified region for a software application.

The information may be processed by the software application for, inter alia:
1. Prioritizing a display of information onto an image captured by the object facing camera.
2. Processing a range within the field of view of an object facing camera. In this instance, the software application includes an augmented reality software application.
3. Performing an automated zooming and cropping process.
4. Performing an automated autofocus and metering process.

Figure 6:
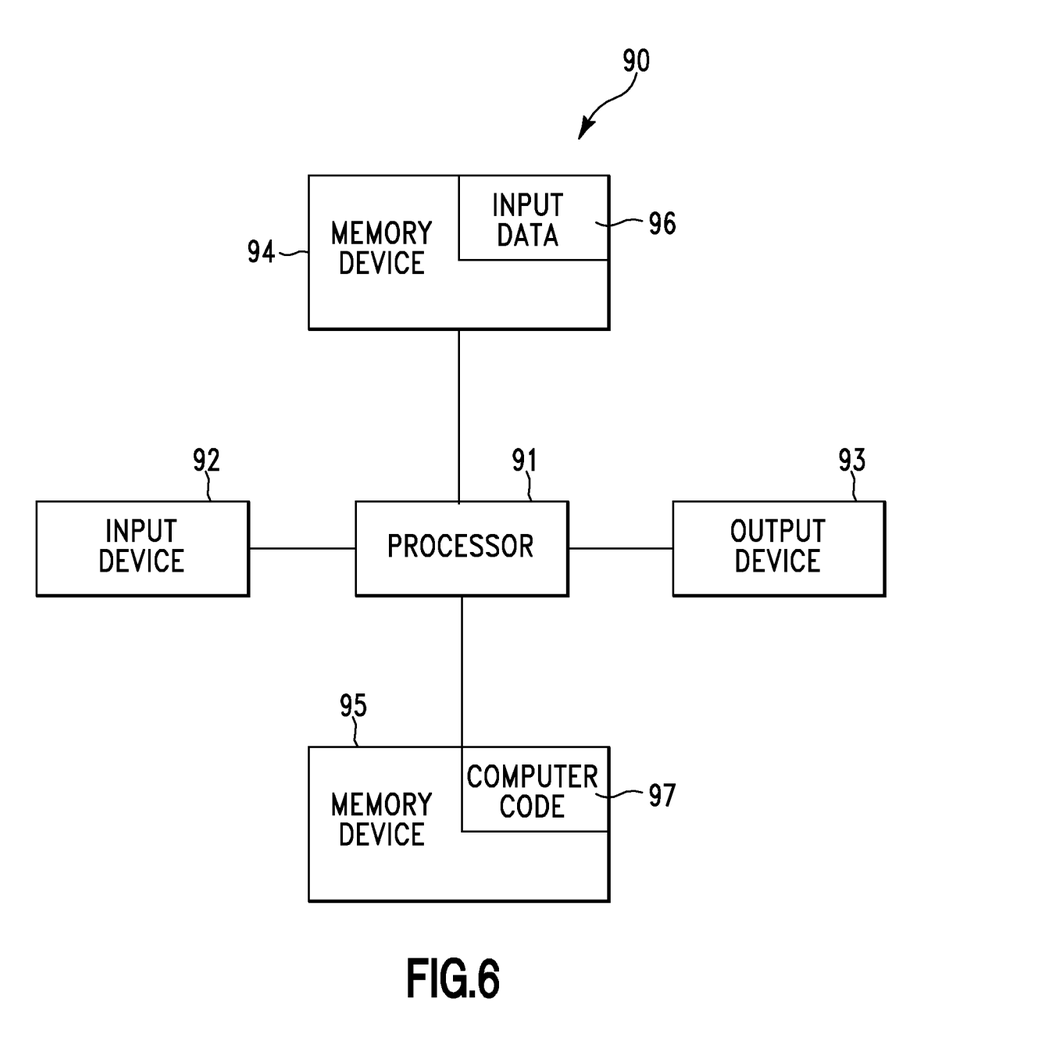
FIG. 6 illustrates a computer apparatus used by the system of FIG. 1 for determining a region within a field of view between a user and an object relative to a mobile device display apparatus, in accordance with embodiments of the present invention.

FIG. 6 illustrates a computer apparatus 90 (e.g., mobile device 110 of FIG. 1A and FIG. 1B) used by system 100 of FIG. 1 for determining a region within a field of view of an object facing camera, in accordance with embodiments of the present invention. The computer system 90 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 5) for determining a region within a field of view of an object facing camera. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 6) may include the algorithm of FIG. 5 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

Still yet, any of the components of the present invention could be created, integrated, hosted, maintained, deployed, managed, serviced, etc. by a service supplier who offers to determine a region within a field of view of an object facing camera. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for determining a region within a field of view of an object facing camera. In another embodiment, the invention provides a business method that performs the process steps of the invention on a subscription, advertising, and/or fee basis. That is, a service supplier, such as a Solution Integrator, could offer to determine a region within a field of view of an object facing camera. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method comprising:
   receiving, by a computer processor of a mobile device from a user facing camera of said mobile device, an image of a user currently using said mobile device;
   determining, by said computer processor based on key features of said image, attributes of said key features, wherein said determining said attributes comprises determining a first angular position of said user's head with respect to said user facing camera;
   determining, by said computer processor based on said key features, a second angular position of said user's eyes with respect to said user facing camera;
   determining, by said computer processor based on results of analyzing said attributes, an origin of a line of sight of said user, said first angular position, and said second angular position, a specified region within a field of view of an object facing camera of said mobile device, wherein said determining said specified region comprises:
      factoring a position of corner portions of a display of said mobile device with respect to said user facing camera;
      factoring at least one position of said display with respect to said object facing camera;
      factoring a position of said user facing camera with respect to said object facing camera; and
      factoring at least one position of a feature of said mobile device with respect to said user facing camera; and
   providing, by said computer processor for a software application, information associated with said specified region.

2. The method of claim 1, wherein said determining said attributes comprises:
   determining a distance of said user with respect to said user facing camera.

3. The method of claim 1, wherein said specified region comprises a point within said field of view, and wherein said point is located relative to a line formed between said origin of said line of sight of said user and a point relative to a location of said user facing camera.

4. The method of claim 1, wherein said key features comprise facial features of said user.

5. The method of claim 4, wherein said facial features comprise eyes of said user.

6. The method of claim 1, wherein said feature comprises a viewfinder of said mobile device.

7. The method of claim 1, wherein said information is processed by said software application for prioritizing a display of information onto an image captured by said object facing camera.

8. The method of claim 1, wherein said information is processed by said software application for processing a range within the field of view of an object facing camera, wherein said range is associated with image analysis, and wherein said software application comprises an augmented reality software application.

9. The method of claim 1, wherein said information is processed by said software application for performing an automated zooming and cropping process.

10. The method of claim 1, wherein said information is processed by said software application for performing an automated autofocus and metering process.

11. The method of claim 1, wherein said user facing camera comprises a plurality of user facing cameras.

12. The method of claim 1, wherein said object facing camera comprises a plurality of object facing cameras.

13. The method of claim 1, wherein said user facing camera and said object facing camera are comprised by at least one single wide field of view camera configured to be rotated to place said at least one single wide field of view camera in a user facing camera mode and an object facing camera mode.

14. The method of claim 1, further comprising: providing a process for supporting computer infrastructure, said process comprising providing at least one support service for at least one of creating, integrating, hosting, maintaining, and deploying computer-readable code in the computing apparatus, wherein the code in combination with the computing apparatus is configured to perform the method of claim 1.

15. A computer program product for field of view region determination, the computer program product comprising:
   one or more computer-readable, tangible hardware storage devices;
   program instructions, stored on at least one of the one or more storage devices, to initiate receiving, from a user facing camera of said mobile device, an image of a user currently using said mobile device;
   program instructions, stored on at least one of the one or more storage devices, to determine, based on key features of said image, attributes of said key features by determining a first angular position of said user's head with respect to said user facing camera;

program instructions, stored on at least one of the one or more storage devices, to determine a second angular position of said user's eyes with respect to said user facing camera;

program instructions, stored on at least one of the one or more storage devices, to determine, based on results of analyzing said attributes, an origin of a line of sight of said user, said first angular position, and said second angular position, a specified region within a field of view of an object facing camera of said mobile device, wherein determining said specified region comprises:

factoring a position of corner portions of a display of said mobile device with respect to said user facing camera;

factoring at least one position of said display with respect to said object facing camera;

factoring a position of said user facing camera with respect to said object facing camera; and factoring at least one position of a feature of said mobile device with respect to said user facing camera; and program instructions, stored on at least one of the one or more storage devices, to initiate providing information associated with said specified region.

16. The computer program product of claim 15, wherein said program instructions to determine attributes of said key features comprises:

program instructions, stored on at least one of the one or more storage devices, to determine a distance of said user with respect to said user facing camera.

17. The computer program product of claim 15, wherein said specified region comprises a point within said field of view, and wherein said point is located relative to a line formed between said origin of said line of sight of said user and a point relative to a location of said user facing camera.

18. The computer program product of claim 15, wherein said key features comprise facial features of said user.

19. The computer program product of claim 18, wherein said facial features comprise eyes of said user.

20. A mobile device comprising a computer processor coupled to a computer-readable memory unit, said memory unit comprising instructions that when executed by the computer processor implements a method comprising:

receiving, by said computer processor from a user facing camera of said mobile device, an image of a user currently using said mobile device;

determining, by said computer processor based on key features of said image, attributes of said key features, wherein said determining said attributes comprises determining a first angular position of said user's head with respect to said user facing camera;

determining, by said computer processor based on said key features, a second angular position of said user's eyes with respect to said user facing camera;

determining, by said computer processor based on results of analyzing said attributes, an origin of a line of sight of said user, said first angular position, and said second angular position, a specified region within a field of view of an object facing camera of said mobile device, wherein said determining said specified region comprises:

factoring a position of corner portions of a display of said mobile device with respect to said user facing camera;

factoring at least one position of said display with respect to said object facing camera;

factoring a position of said user facing camera with respect to said object facing camera; and factoring at least one position of a feature of said mobile device with respect to said user facing camera; and providing, by said computer processor for a software application, information associated with said specified region.

* * * * *